US012627599B2

(12) United States Patent
Mishra et al.

(10) Patent No.: US 12,627,599 B2
(45) Date of Patent: May 12, 2026

(54) SERVICE TREE FOR MULTICAST FLOW VISIBLITY

(71) Applicant: Cisco Technology, Inc., San Jose, CA (US)

(72) Inventors: Mankamana Prasad Mishra, San Jose, CA (US); Rajiv Asati, Morrisville, NC (US); Nitin Kumar, San Jose, CA (US); Krishnaswamy Muddenahally Anathamurthy, Leander, TX (US); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 530 days.

(21) Appl. No.: 18/117,841

(22) Filed: Mar. 6, 2023

(65) Prior Publication Data
US 2024/0305562 A1 Sep. 12, 2024

(51) Int. Cl.
H04L 45/48 (2022.01)
H04L 43/12 (2022.01)
H04L 45/30 (2022.01)

(52) U.S. Cl.
CPC .............. H04L 45/48 (2013.01); H04L 43/12 (2013.01); H04L 45/30 (2013.01)

(58) Field of Classification Search
CPC ......... H04L 45/48; H04L 43/12; H04L 45/30; H04L 43/10
See application file for complete search history.

(56) References Cited

U.S. PATENT DOCUMENTS

| | | | |
|---|---|---|---|
| 6,134,599 A * | 10/2000 | Chiu | H04L 45/48 |
| | | | 370/408 |
| 8,218,430 B2 | 7/2012 | Zhao | |
| 9,030,926 B2 | 5/2015 | Han et al. | |
| 10,243,841 B2 | 3/2019 | Gupta et al. | |
| 11,296,980 B2 | 4/2022 | Radhakrishnan | |
| 2002/0073086 A1 * | 6/2002 | Thompson | H04L 41/04 |
| 2007/0174483 A1 | 7/2007 | Raj et al. | |
| 2015/0058479 A1 * | 2/2015 | Kolhi | H04L 43/0858 |
| | | | 709/224 |

* cited by examiner

*Primary Examiner* — Kibrom T Hailu
(74) *Attorney, Agent, or Firm* — Lee & Hayes, P.C.

(57) ABSTRACT

According to one or more embodiments of the disclosure, an example process herein may comprise: causing, responsive to a triggering event, establishment of a service tree that follows a same path as a multicast parent tree through a data communication network to one or more intended recipient devices; causing a duplication of a particular flow from the multicast parent tree to the service tree; causing a determination of a performance characteristic of the particular flow through the service tree; and causing an association of the performance characteristic with the multicast parent tree.

18 Claims, 13 Drawing Sheets

700

708

704

702-1
702-2
702-3
702-4
702-5
702-N

900

905

START

910

CAUSE ESTABLISHMENT OF A SERVICE TREE

915

CAUSE DUPLICATION OF A FLOW FROM A
PARENT TREE TO THE SERVICE TREE

920

CAUSE DETERMINATION OF A PERFORMANCE CHARACTERISTIC
OF THE FLOW THROUGH THE SERVICE TREE

925

CAUSE AN ASSOCIATION OF THE PERFORMANCE
CHARACTERISTIC TO A PARENT TREE

930

END

SERVICE TREE FOR MULTICAST FLOW VISIBLITY

TECHNICAL FIELD

The present disclosure relates generally to computer systems, and, more particularly, to a service tree for multicast flow visibility.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services.

One issue negatively impacting service performance and/or user experience can be packet loss. However, identifying a source of packet loss within a network topology can be challenging. This may be especially true with multicast flow communications across service provider networks. In such instances, multiple such flows may be aggregated into a tunnel for communication across a service provider network. Unfortunately, there is no mechanism providing per-flow visibility of the traffic within the tunnel. As a result, even when a packet is discovered to be missing at a last hop router of the tunnel, there is no way to rapidly and precisely determine which node within the network dropped the packet. Therefore, service performance and/or user experience degradations are often allowed to persist for weeks on end as intensive monitoring and brute force efforts are undertaken to identify the failure point by trial and error.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an example process herein may comprise: causing, responsive to a triggering event, establishment of a service tree that follows a same path as a multicast parent tree through a data communication network to one or more intended recipient devices; causing a duplication of a particular flow from the multicast parent tree to the service tree; causing a determination of a performance characteristic of the particular flow through the service tree; and causing an association of the performance characteristic with the multicast parent tree.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computer network.
Figure 1:
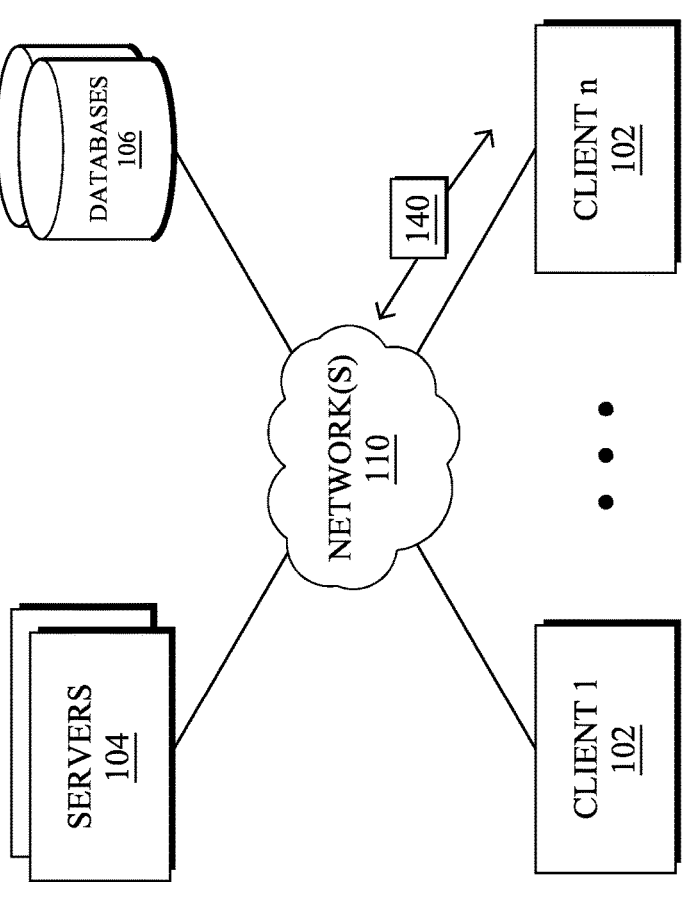

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
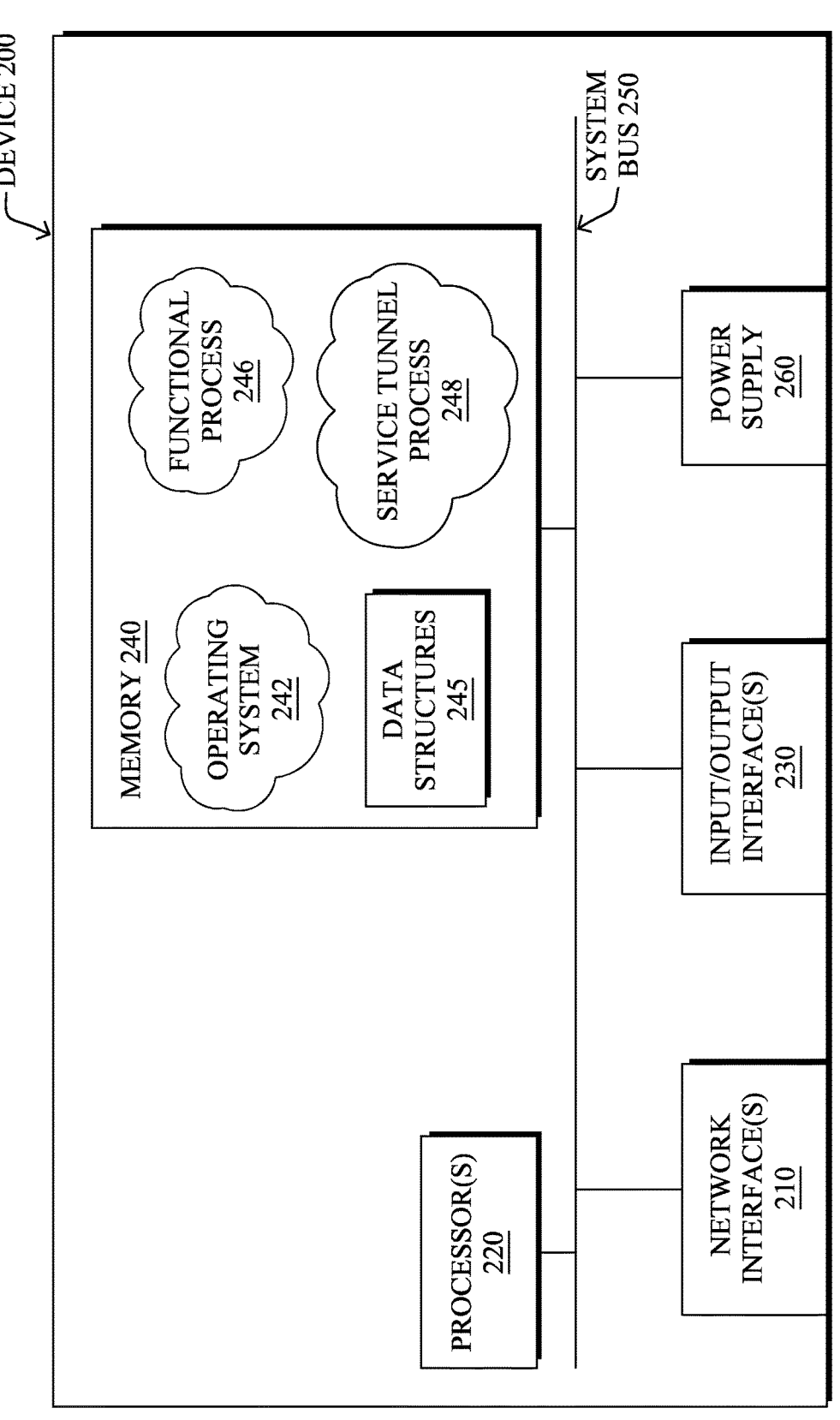
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative service tunnel process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT)

operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
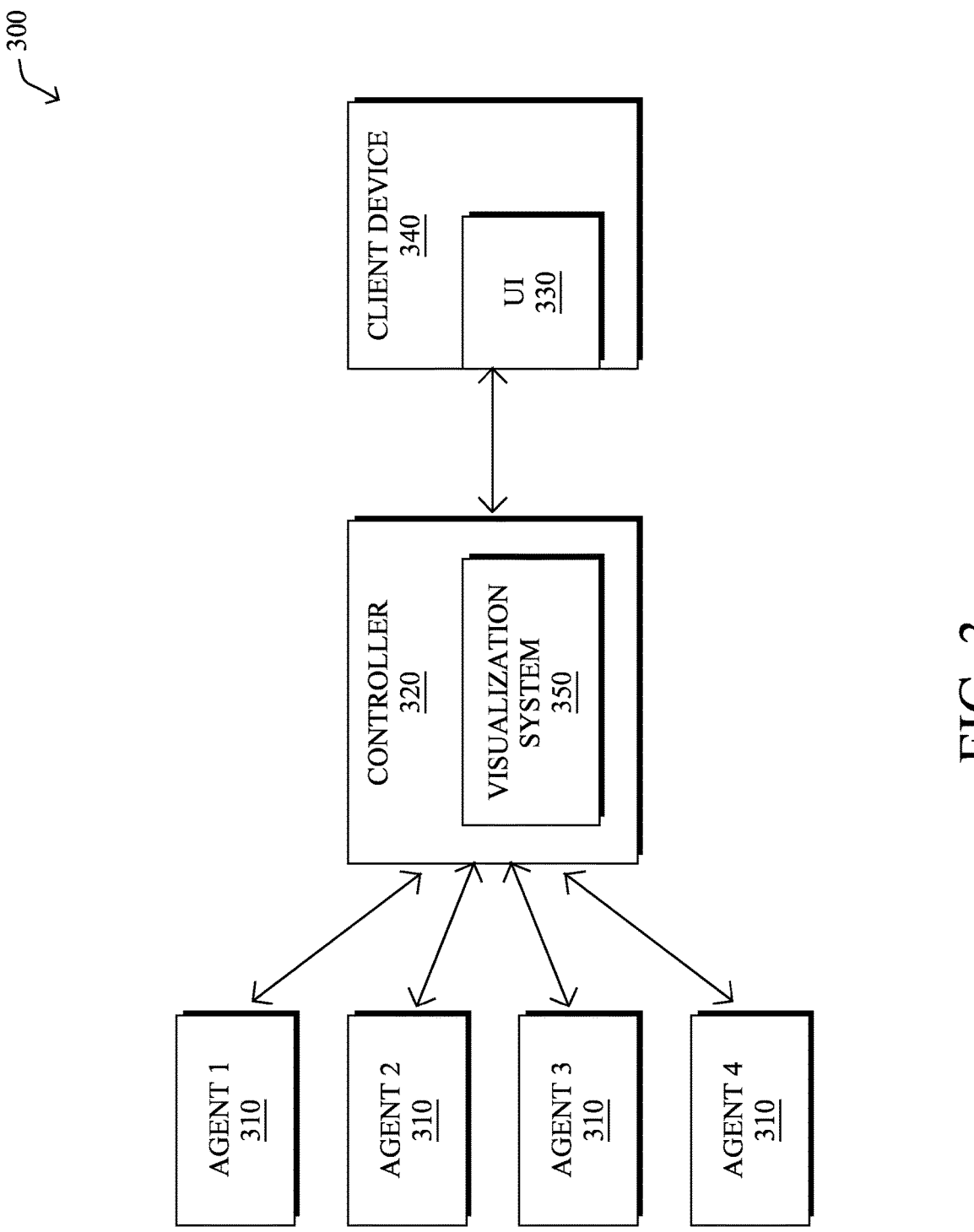
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller 320 instance may be hosted remotely by a provider of the observability intelligence platform 300. In an illustrative on-premises (On-Prem) implementation, a controller 320 instance may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——Multicast Flow Communication——

Figure 4:
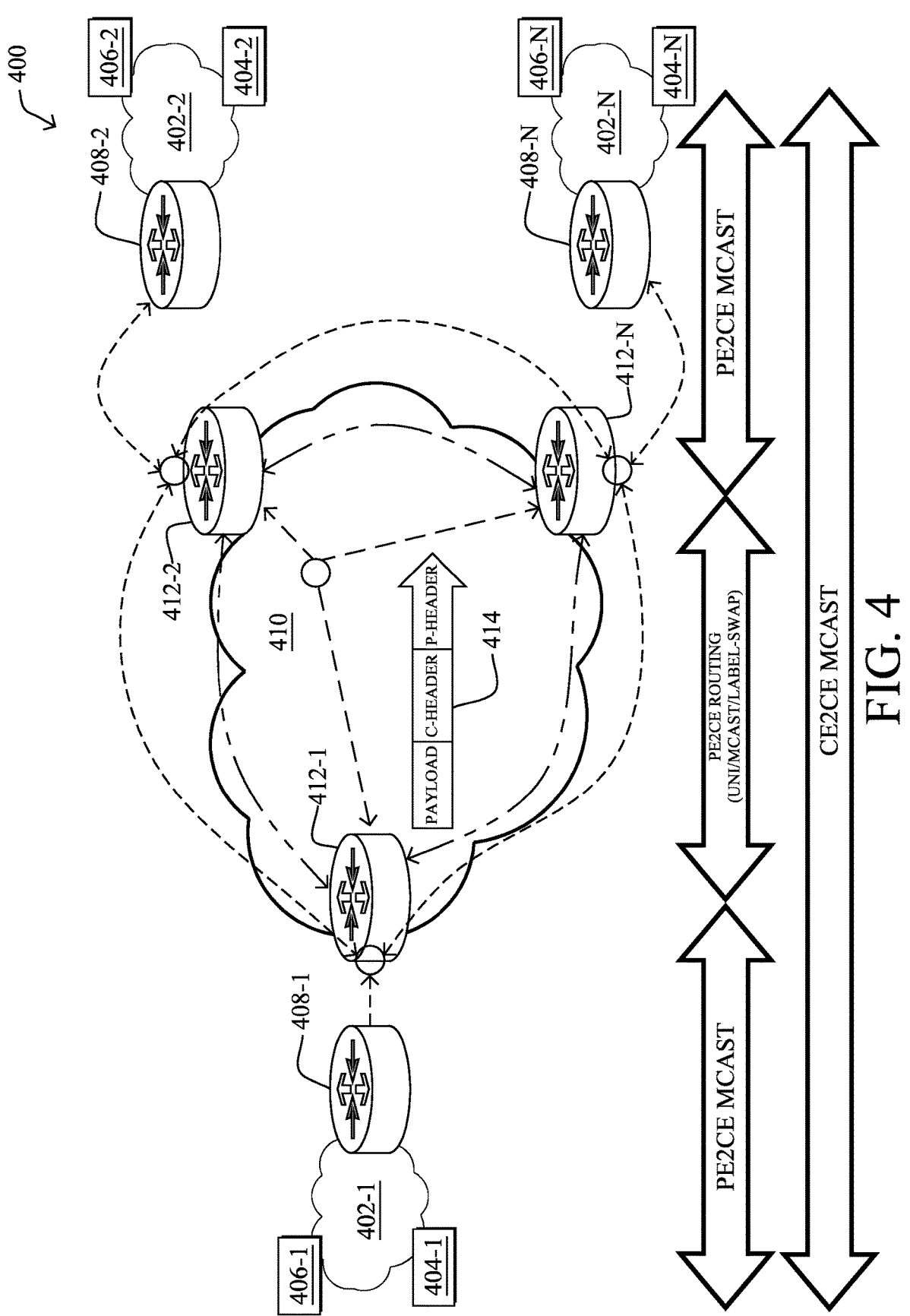
FIG. 4 illustrates an example of a simplified network communication topology for multicast flow communication.

FIG. 4 illustrates an example of a simplified network communication topology 400 for multicast flow communication, in accordance with one or more embodiments described herein. Simplified network communication topology 400 may include customer sites 402 (e.g., 402-1 . . . 402-N) which communicate customer data flows to one another across a service provider network 410. For example, each of the customer sites 402 may include a traffic receiver 404 (e.g., 404-1 . . . 404-N) and/or a flow source 406 (e.g., 406-1 . . . 406-N) where customer flows are received and/or sent.

The customer data flows may be data communicated from a customer edge device (CE 408 (408-1 . . . 408-N)), such as an access point on the edge of a customer network, to one or more other customer edge devices. In some examples, the customer flows may be communicated to a service provider edge device (PE 412 (e.g., 412-1 . . . 412-N), such as an access point on the edge of a service provider network, for multicast communication across the service provider network 410.

The traffic 414 making up the customer flow may include, in addition to the payload, one or more headers that provide its routing information. For example, traffic 414 may include a p-header. The p-header may provide information regarding how traffic 414 is supposed to navigate through the service provider network 410. Traffic 414 may additionally include a c-header. The c-header may include actual flow information.

The traffic 414 may be communicated across simplified network communication topology 400 as a CE 408 to CE

408 (CE2CE) multicast communication. In various embodiments, this communication may include communication of the traffic 414 from a customer network into the service provider network 410 and/or from the service provider network 410 into one or more receiving customer networks via a CE 408 to PE 412 and/or a PE 412 to CE 408 (PE2CE) multicast communication. In various embodiments, the traffic 414 may be communicated within the service provider network 410 via one or more PE 412 to PE 412 (PE2PE) communications. The PE2PE communications may be unicast communications, multicast communications, label-swapping communications, etc.

Figure 5:
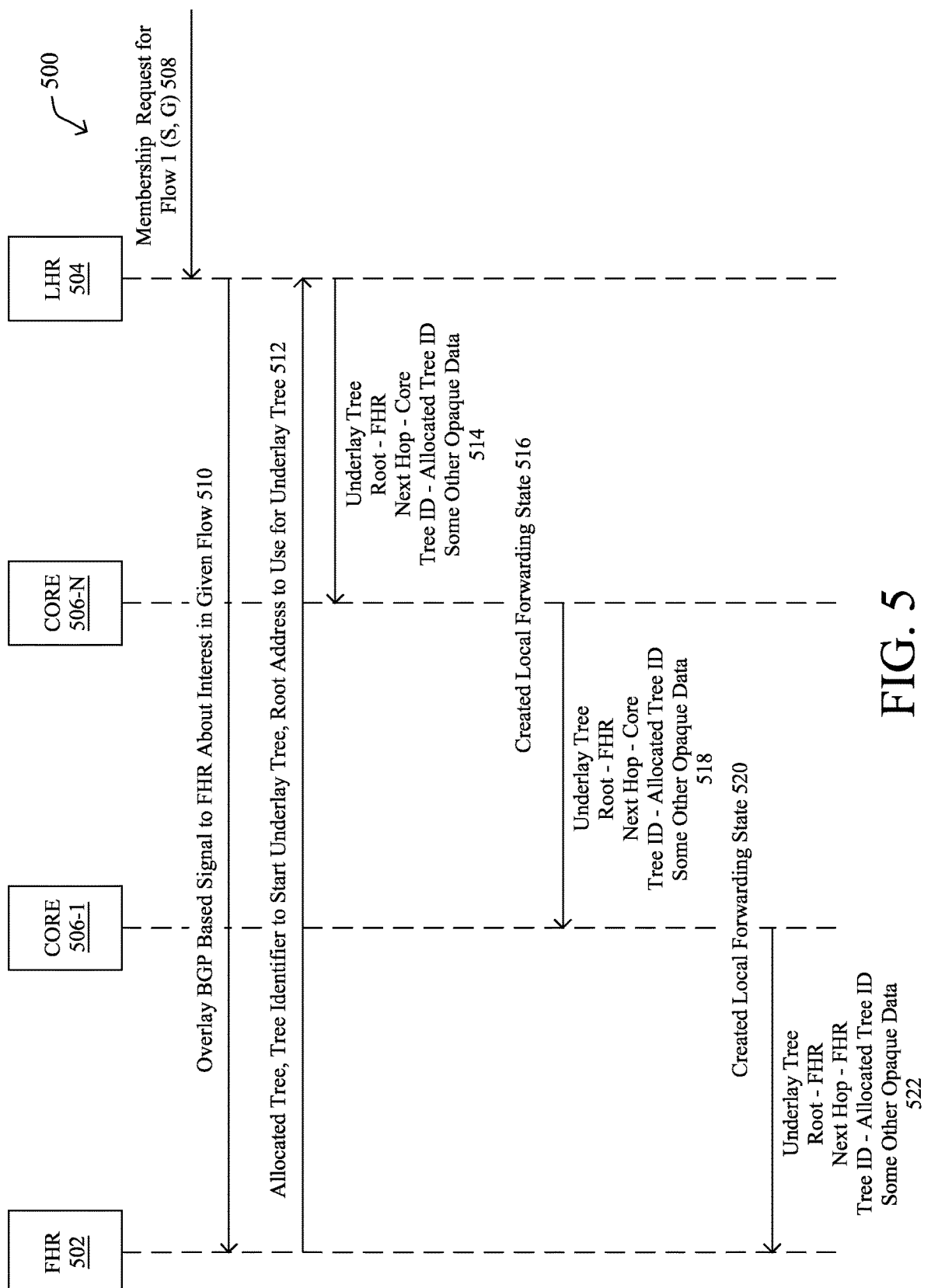
FIG. 5 illustrates an example of an operation for constructing a multicast tree for multicast flow communication.

FIG. 5 illustrates an example of an operation 500 for constructing a multicast tree for multicast flow communication, in accordance with one or more embodiments described herein. Operation 500 may be performed across a network communication topology such as the simplified network communication topology 400 of FIG. 4. In various embodiments, operation 500 may occur over communicatively coupled network components or nodes including a first hop router (FHR 502), a last hop router (LHR 504), and one or more core router 506 (e.g., 506-1 . . . 506-N) stationed as communication intermediaries between FHR 502 and LHR 504.

FHR 502 may be a first router or hop encountered by data from a source with respect to a multicast service. FHR 502 may be the first router where a multicast source is either directly connected or connected via some other LAN. In various embodiments, FHR 502 may be located at a customer site where a multicast source is located.

The one or more core router 506 may be part of a network provided by a service provider cloud. In some instances the one or more core router 506 may be a router in a network which participates only in forwarding and underlay tree building. In various embodiments, none of the overlay signaling may be applicable to the one or more core router 506, there may be no BGP running there, and/or it may be pure IP or MPLS or SR forwarding with IGP.

LHR 504 may be a last router or hop encountered by data from a source with respect to a multicast service. LHR 504 may be the first router where a multicast receiver is either directly connected or connected via some other LAN. In various embodiment, LHR 504 may be located at one or more site where multicast receivers are located.

At box 508, a membership request from a local site may be received. The membership request may be a request for a particular flow that a receiver at the site is interested in receiving. At box 510, LHR 504 may communicate an overlay Border Gateway Protocol (BGP) based signal to FHR 502 expressing that interest in the particular flow. At this point, neither the LHR 504 nor the receiver may be aware of the route by which the particular flow is to be received.

At box 512, FHR 502 may allocate a multicast tree upon which the traffic of the particular flow will be delivered to the LHR 504 and, ultimately, to the receiver at the one or more requesting sites. FHR 502 may communicate the allocated tree, a tree identifier to start the underlay tree constructions, and/or a root address to use for the underlay tree construction back towards LHR 504.

Once the tree has been allocated, LHR 504 may start joining the tree hop-by-hop to establish local forwarding states in the service provider network and establish the flow of traffic. For example, at box 514, LHR 504 may join the underlay tree specifying FHR 502 as the root, the next hop as second core 506-N, the tree ID as the allocated tree ID received from FHR 502, and/or some other opaque data. As a result, at box 516 a local forwarding state may be created at the second core 506-N.

At box 518 Second core 506-N may join the underlay tree specifying FHR 502 as the root, the next hop as first core 506-1, the tree ID as the allocated tree ID received from FHR 502, and/or some other opaque data. As a result, at box 520, a local forwarding state may be created at the first core 506-1. At box 522, first core 506-1 may join the underlay tree specifying FHR 502 as the root, the next hop as FHR 502, the tree ID as the allocated tree ID received from FHR 502, and/or some other opaque data.

Figure 6:
FIG. 6. illustrates an example of an operation for aggregating multicast flows.
Figure 6:
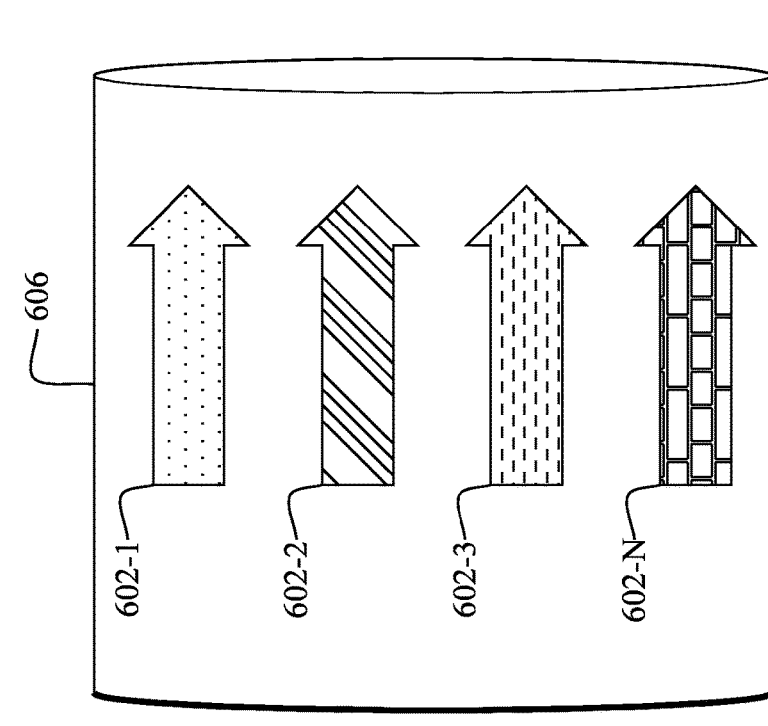
Figure 6:
Figure 6:
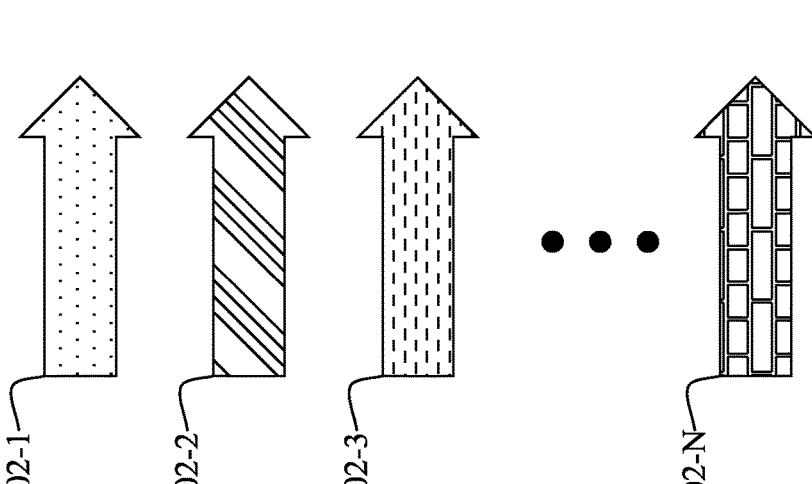

FIG. 6 illustrates an example of an operation 600 for aggregating multicast flows 602 (e.g., 602-1 . . . 602-N), in accordance with one or more embodiments described herein. In various embodiments, service provider networks connect different customers and facilitate communication of multicast flows 602 therebetween. The multicast flows 602 may be IP multicast flows.

Customers may have large numbers of multicast flows 602 to communicate. Often, it is far too resource intensive for a service provider to provide per-customer-flow trees within their network. Instead, service providers may only provide a customer a limited number of trees per virtual private network (VPN).

In various embodiments, the multicast flows 602 from a source may be received at a provider edge device at a virtual routing and forwarding (VRF) interface. Each of the multicast flows 602 may be aggregated 604 into a tunnel 606. In some examples, tunnel 606 may be an aggregated MPLS tunnel and/or utilize label forwarding only. In various embodiments, each of the multicast flows 602 may be mapped to a tunnel 606 which will carry that flow across the service provider network to one or more multicast receivers for that flow.

Figure 7:
FIG. 7 illustrates an example of a flow visibility for aggregated multicast flows.
Figure 8A:
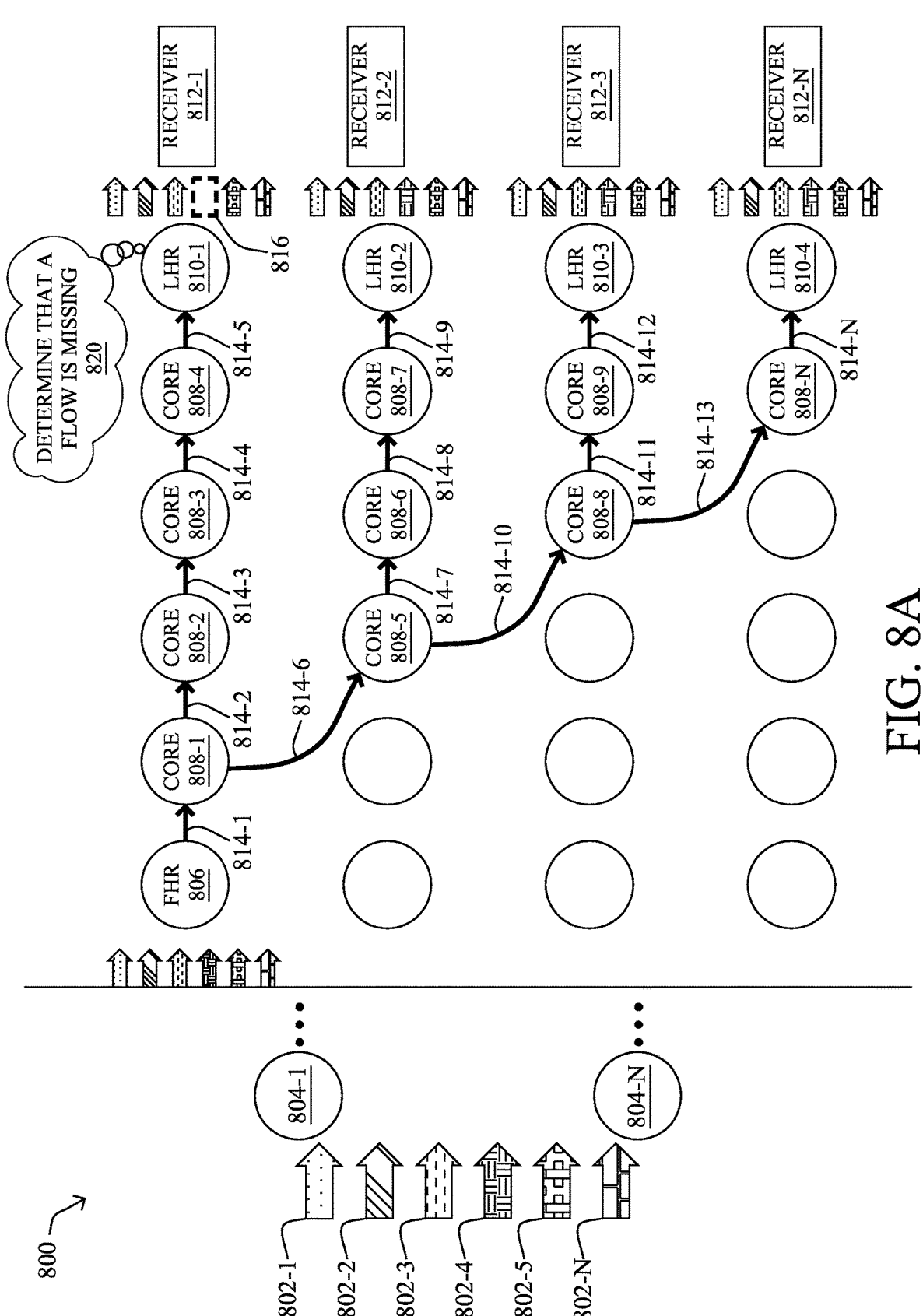
FIGS. 8A-8E illustrate an example of an operation for utilizing a service tree for multicast flow visibility.
Figure 8B:
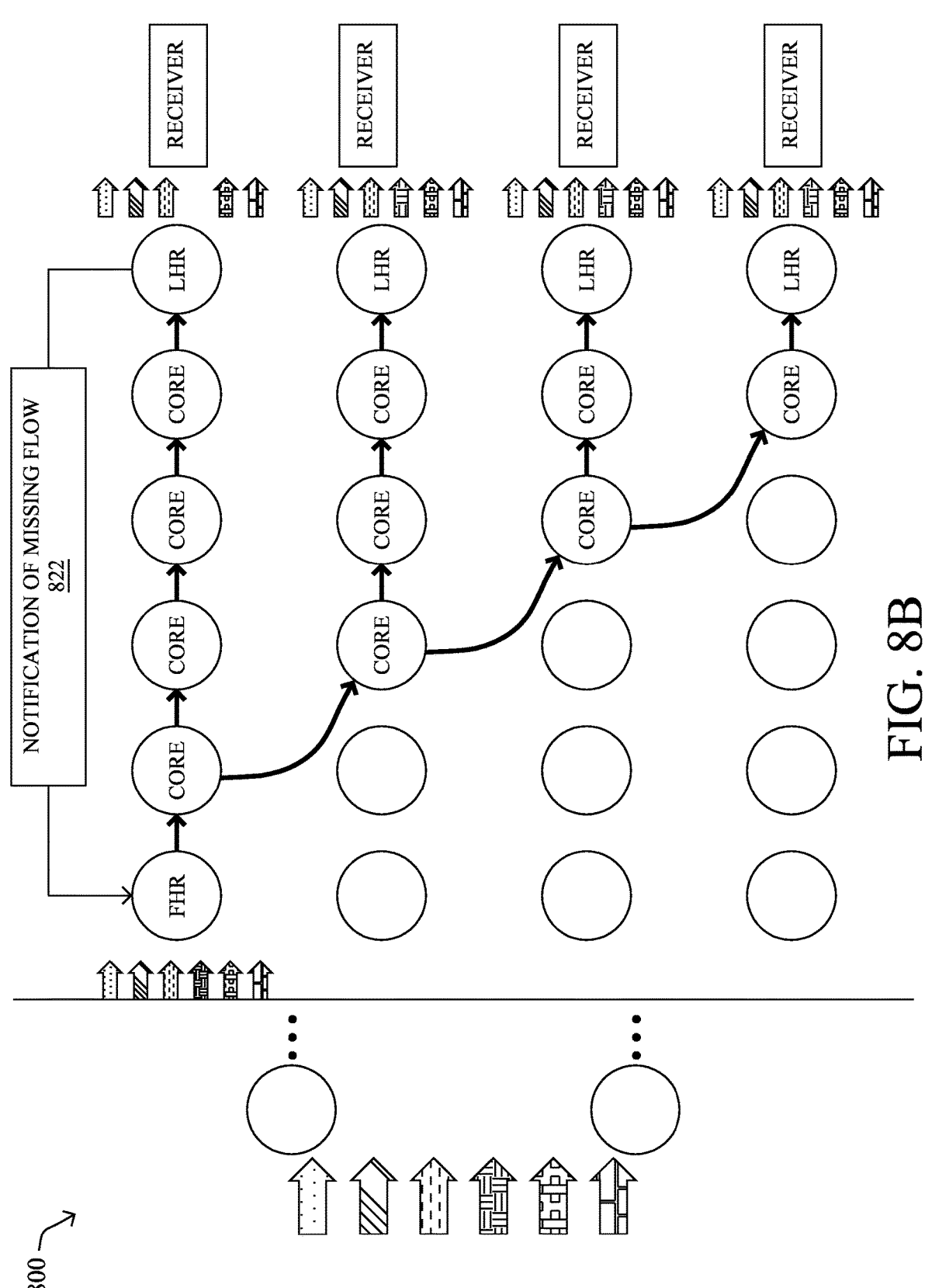
Figure 8C:
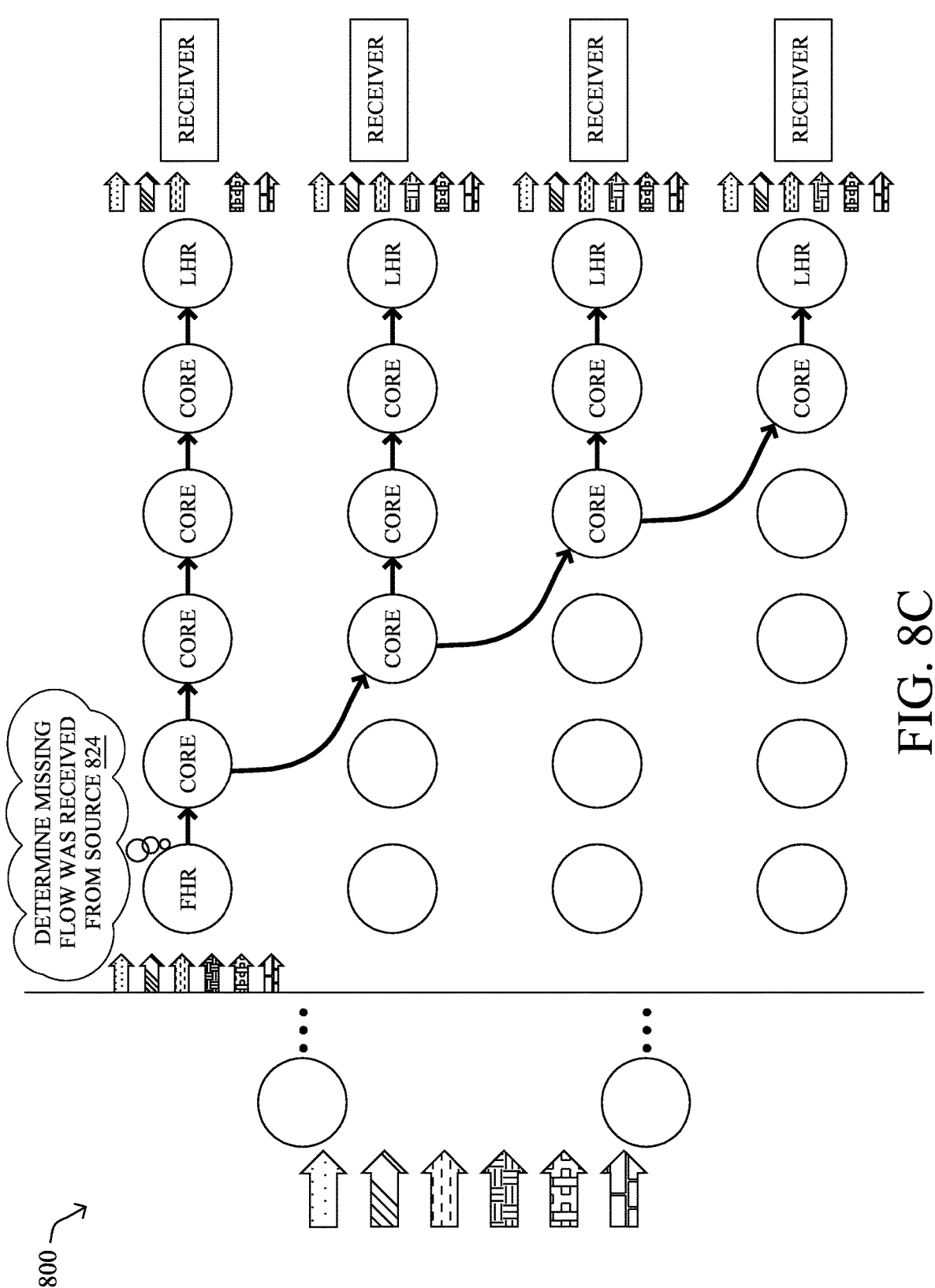
Figure 8D:
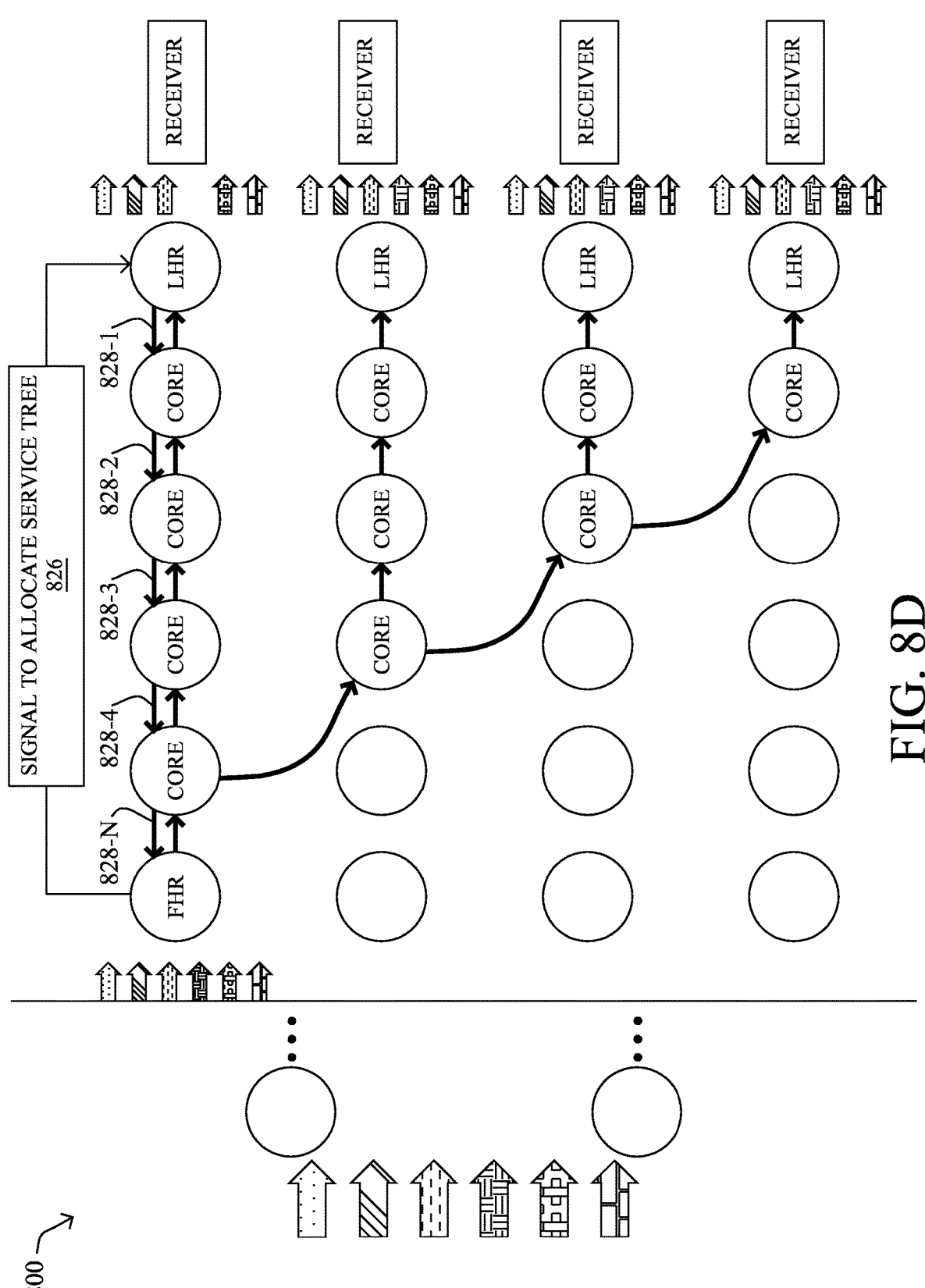
Figure 8E:
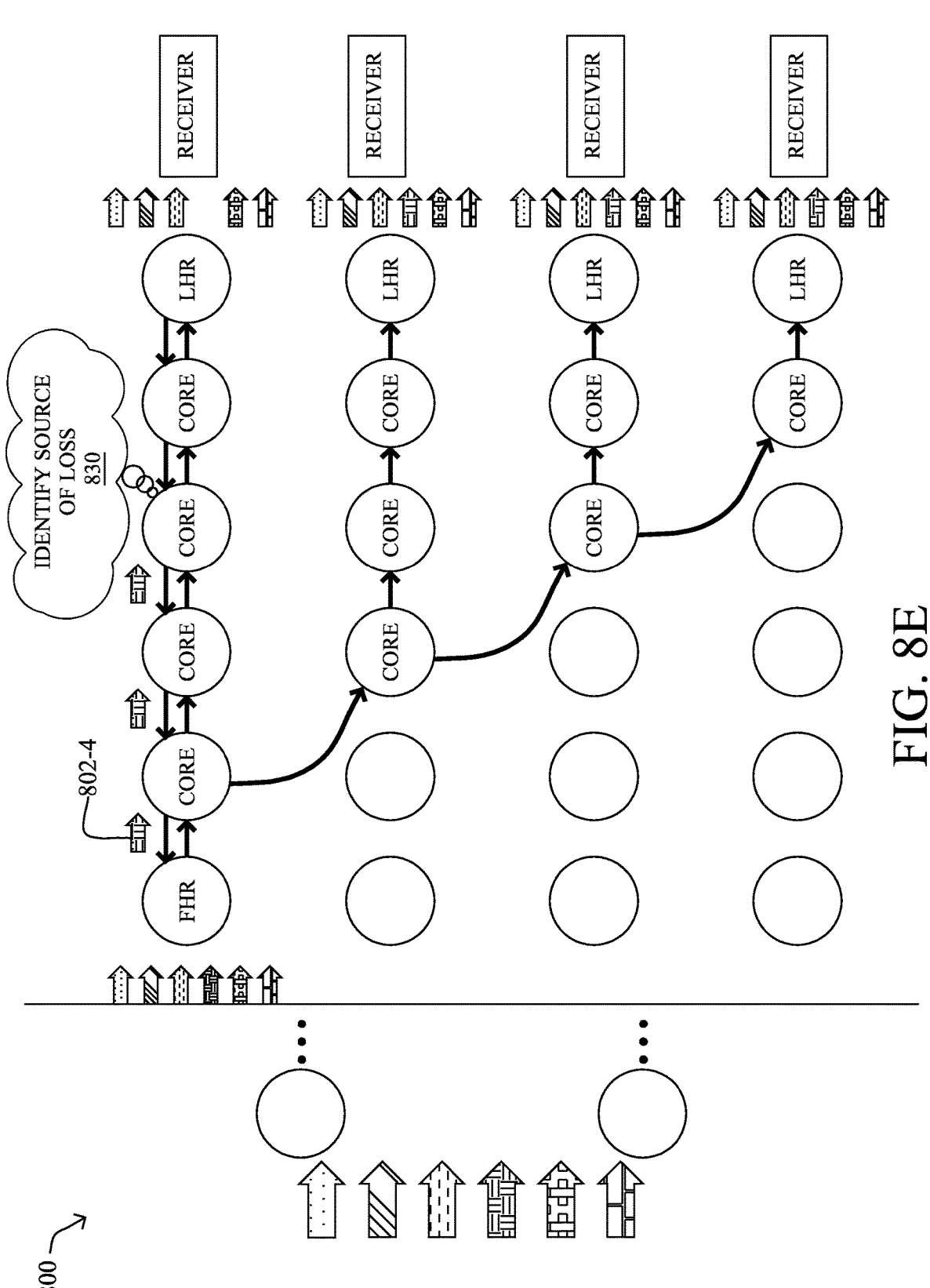

FIG. 7 illustrates an example of an intermediary node flow visibility 700 of aggregated multicast flows, in accordance with one or more embodiments described herein. For example, a plurality of multicast flows 702 (e.g., 702-1 . . . 702-N) may be aggregated into an aggregated tunnel 704 for multicast communication across a service provider network.

The plurality of multicast flows 702 may be visible as distinct flows to an FHR and/or an LHR in the service provider network. The FHR and LHR may have visibility of each flow because they participate in encapsulation and/or decapsulation of the plurality of multicast flows 702 when entering and/or exiting the aggregated tunnel 704.

In contrast, intermediary or core nodes/routers of the service provider network may not see the individual flows being transported within the aggregated tunnel 704. Instead, core router visibility may only extend to knowledge of the presence of an aggregation of flows 708 (e.g., traffic) within the aggregated tunnel 704 to be forwarded to a receiver. Therefore, the cord nodes may operate without any insight into any individual flows within the aggregated tunnel 704.

——Service Tree for Multicast Flow Visibility——

As noted above, intermediate nodes in computing networks participating in multicast flow communication do not have per-flow visibility of the traffic that they are communicating. For instance, it is nearly impossible to perform deep packet inspection to read customer flow information in order to identify individual flows within a tunnel.

Further, while delivery of "n" flows is occurring using a single tunnel provider, each flow will have its own characteristics. For instance, each flow may have a different size and/or a different nature. This can lead to some of the flows aggregated into a tunnel ultimately being too big or too small for transmission in the tunnel. For example, a software bug or a configured low maximum transmission unit (MTU) in a core node of a network may prevent the transmission of some packets having particular attributes within the tunnel. This may result in these mis-sized packets being dropped. Again, given the natural variability in each of the flows, only some of the flows may not be delivered to the receiver whereas other flows will continue being delivered normally.

If out of one thousand flows only one hundred flows are not receiving multicast traffic, then it may become very challenging to debug the network and quickly identify the source of the problem. While counters may be deployed for a tunnel in order to generally determine that flows are missing, this does not help identify the potential source of a dropped packet. These counters fail to provide any insight into which flow is being dropped and at which node in the network they are being dropped.

Contemporary approaches to tunnel traffic monitoring are based around a mistaken understanding about aggregated traffic delivery over a tunnel. Namely, there is a misconception that every packet in a tunnel will have same fate regardless of its attributes. However, each flow may have individual characteristics and differences in platform and/or MTU may play a role in how different sized packets are handled.

For instance, a software bug may cause a packet to be dropped if its size is <X bytes. Then, out of thousands of flows, only those that are sized under this value may be dropped. Operations, Administration, and Maintenance (OAM) technology and/or multicast traces are not able to identify the source of this problem. For example, OAM technology may help only to verify control plane state and basic data plane forwarding but it does not help to test real data characteristics. A multicast trace also helps only to verify control plane state and aggregate tunnel state, but it cannot detect the flow which is failing. Also, it is not practical to generate different size packets to really simulate all different data traffic profile in a tunnel, whereas the failure may be associated with data plane characteristics.

In contrast, the techniques herein, introduce a service tree mechanism which provides substantial visibility of a network on the fly without impacting services on the network. The service tree mechanism may provide insight into traffic communications in a network at a per-flow level. The insight provided by the service tree mechanism may be utilized for failure identification, debugging, network probing, etc. In various embodiment, the service tree mechanism may be employed to identify a missing flow and rapidly and automatically pinpoint which part of the network is dropping the flow without extensive testing or traffic disruption.

Specifically, according to one or more embodiments described herein, an example process herein may comprise: causing, responsive to a triggering event, establishment of a service tree that follows a same path as a multicast parent tree through a data communication network to one or more intended recipient devices; causing a duplication of a particular flow from the multicast parent tree to the service tree; causing a determination of a performance characteristic of the particular flow through the service tree; and causing an association of the performance characteristic with the multicast parent tree.

Operationally, FIGS. 8A-8E illustrate an example of an operation 800 for utilizing a service tree for multicast flow visibility, in accordance with one or more embodiments described herein. The operation 800 may occur across a data communication and/or computing network (e.g., a service provider network). The network may include a series of communicatively linked communication nodes that deliver data traffic from a data source 804 (e.g., 804-1 . . . 804-N) to a traffic receiver 812 (e.g., 812-1 . . . 812-N).

The communication nodes may communicate a plurality of multicast flows 802 (e.g., 802-1 . . . 802-N) across an aggregated tunnel configured as parent tree 814 (e.g., 814-1 . . . 814-N). The plurality of multicast flows 802 may be encapsulated and/or aggregated into the parent tree 814 at FHR 806. The plurality of multicast flows 802 may be forwarded along the branches of the parent tree 814 through a core node 808 (e.g., 808-1 . . . 808-N) toward a traffic receiver 812. The plurality of multicast flows 802 may be decapsulated and/or exit the parent tree 814 at LHR 810 (e.g., 810-1 . . . 810-N).

In some instances, a particular flow 802-4 may not arrive at an intended LHR 810-1 and/or an intended receiver 812-1. The particular flow 802-4 may, for example, be dropped at a core node 808 along the parent tree 814 before arriving at the intended LHR 810-1 and/or the intended receiver 812-1. The result of this flow loss may be a missing flow 816 which is detectable at/by the intended LHR 810-1, the intended receiver 812-1, and/or a device communicatively coupled thereto. In some examples, the flow loss may not be detectable at a core node 808 since this type of node may not be aware of which flows are being transported within the parent tree 814. However, it should be understood that this is a non-limiting example and that a missing flow 816 may be identifiable at any device or network node equipped with a per-flow detection capability including a core node 808 or a device communicatively coupled thereto.

Operation 800 may include making a determination 820 that the particular flow 802-4 is missing. The determination 820 may be made based on a comparison of each of the plurality of multicast flows 802 received versus those expected to be received. Again, the determination 820 may be made by the intended node (e.g., core node, LHR, etc.) and/or a device (e.g., controller, a device executing an observability utility, a device executing a telemetry collection utility, a counter, etc.) communicatively coupled thereto.

Upon making the determination 820 that the particular flow 802-4 is a missing flow 816, a notification 822 of the missing flow 816 may be generated and/or communicated to an upstream node. For example, the intended LHR 810-1 may send notification 822 to FHR 806. Notification 822 may identify the particular flow 802-4 is a missing flow 816 at an intended LHR 810-1 and/or an intended receiver 812-1.

Then, a second determination 824 may be made as to whether the particular flow 802-4, identified as the missing flow 816 in notification 822, was originally received at FHR 806 from a data source 804. For example, FHR 806 and/or a device communicatively coupled thereto may determine whether the particular flow 802-4 was received at FHR 806 from the data source 804 in the first place. The second determination 824 may be made based on a comparison of identifying characteristics of the particular flow 802-4 to corresponding identifying characteristics of flows received at FHR 806.

In some instances, the second determination 824 may be that the particular flow 802-4 was not received at FHR 806. In such instances, it may be assumed that the data source 804 is the source of the flow loss or that no flow was ever sent therefrom. Therefore, no action may be taken and/or a non-receipt notification may be generated and/or communicated to other nodes, the data source 804, the intended LHR 810-1, the intended receiver 812-1, and/or an observability platform.

Alternatively, the second determination 824 may be that the particular flow 802-4 was received at FHR 806 from the data source 804 despite not being received at its intended destinations. Therefore, it may be assumed that the source of the flow loss is likely within the parent tree 814. Upon determining that the particular flow 802-4 was received at FHR 806 from the data source 804, FHR 806 may send a signal 826 to allocate a service tree 828 (e.g., 828-1 . . . 828-N). The signal 826 may be an overlay signal sent to the intended LHR 810-1 for the particular flow 802-4.

The signal 826 may specify a service tree identifier for service tree 828, information for identifying the parent tree 814 and/or its particular path through the network, the particular flow 802-4 that the service tree 828 will be used to communicate, etc. After receiving signal 826, the intended LHR 810-1 may begin to build the underlay tree (e.g., service tree 828) towards the FHR 806 and/or data source 804.

The intended LHR 810-1 may build the service tree 828 so that is precisely follows the same data communication route through the network as that of the parent tree 814 specified in the signal 826. The intended LHR 810-1 may mark the service tree 828 as a child of the parent tree 814 so that each hop in the network picks a next hop that is directly the same as the hop structure of the parent tree 814 instead of making an independent decision which may deviate from the parent tree 814.

The service tree 828 may be utilized as a service tunnel that mirrors the parent tree 814. In its capacity as a service tunnel, service tree 828 may be utilized to isolate communication of the particular flow 802-4 without impacting another service and/or traffic receiver 812. As such, service tree 828 may be used to provide per-flow insight into the communication of the missing flow 816 in order to identify potential sources of flow loss. In some instances, counters or other telemetry collectors may be deployed to collect telemetry data at one or more of the nodes of the service tree 828 in order to monitor the communication of the particular flow 802-4 through the service tree 828.

After service tree 828 has been built, then a copy of the particular flow 802-4 that was sent on the parent tree 814 may be sent over the service tree 828. The duplicated flow may be sent from FHR 806 to the intended LHR 810-1 and/or the intended receiver 812-1 on a path that is identical to that of the parent tree 814. The copy of the particular flow 802-4 may be the only flow communicated in the service tree 828.

Telemetry data may be collected from each of the nodes of the service tree 828 involved in communicating the particular flow 802-4. The telemetry data may be transmitted to a controller or proceeds locally in command-line interface (CLI) admin to identify 830 a performance characteristic of the service tree 828, such as the source of flow loss. For example, the telemetry data may be processed to identify 830 the particular core node 808-3 where the particular flow 802-4 is dropped in the service tree 828.

The identified performance characteristics of the service tree 828 may be associated to the parent tree 814. For example, source of flow loss for the particular flow 802-4 in the parent tree 814 may be inferred as being the same as the identified source of flow loss for the copy of the particular flow 802-4 in the service tree 828. The identified source of flow loss and/or other identified information that may be utilized to debug the flow loss may be communicated to an observability utility and/or to a network administrator. The identified source of flow loss and/or other identified information may be utilized to debug and/or correct the flow loss in the parent tree 814. For example, the identification of the particular core node 808-3 where the particular flow 802-4 is dropped in the parent tree 814 may be utilized to identify and/or correct an MTU setting leading to the packet loss.

After the performance characteristic has been identified and/or the issue identified by the performance characteristic has been resolved in the parent tree 814, the service tree 828 may be dismantled. That is, in some instances, the service tree 828 may serve as a temporary service tunnel for per-flow testing of performance characteristics of the particular flow 802-4 and the nodes communicating that flow. By dismantling the service tree 828 after issue identification and/or restoration of successful communication of the particular flow 802-4 through the parent tree 814, network resources may be conserved in the absence of a problem.

Figure 9:
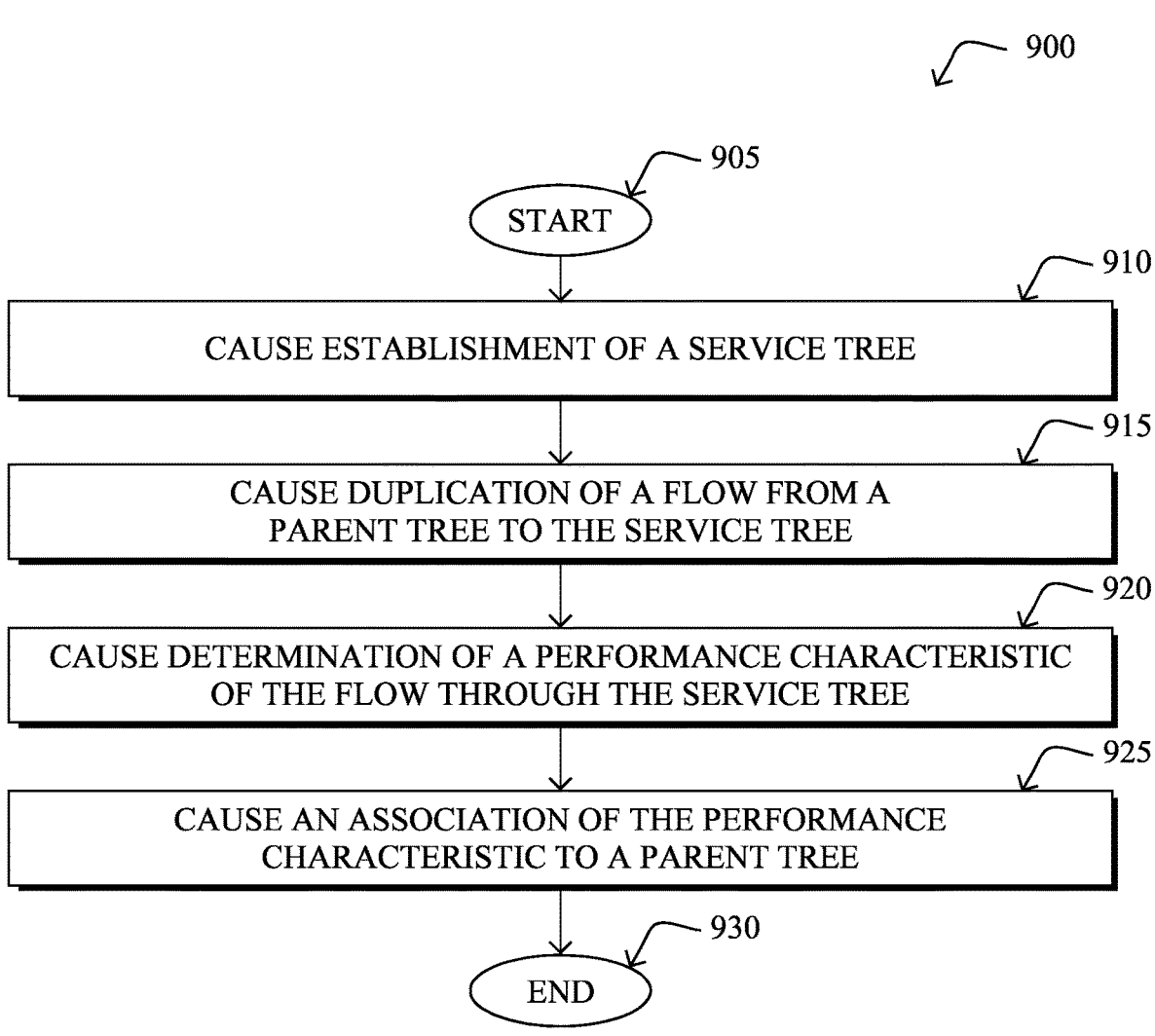
FIG. 9 illustrates an example simplified procedure for utilizing a service tree for multicast flow visibility, in accordance with one or more embodiments described herein.

In closing, FIG. 9 illustrates an example simplified procedure for utilizing a service tree for multicast flow visibility in accordance with one or more embodiments described herein. For example, a non-generic, specifically configured device (e.g., device 200) may perform procedure 900 by executing stored instructions (e.g., service tunnel process 248). Notably, the device performing the procedure (process 248) may be an LHR/tail-end node, an intermediate hop/core node, an FHR/head-end node, a controller with management control of the multicast parent tree, a third-party device with capability to cause establishment of a service tree, and so on. Moreover, each type of device/process may be configured with its own set of triggering conditions, such as non-receipt of flows, metric collection, testing, etc., as described herein or as may otherwise be appreciated by those skilled in the art.

The procedure 900 may start at step 905, and continues to step 910, where, as described in greater detail above, a process may cause, responsive to a triggering event, establishment of a service tree that follows a same path as a multicast parent tree through a data communication network to one or more intended recipient devices. In some examples, the process may cause the one or more intended recipient devices to join the service tree based on a notification that the particular flow is to be duplicated in the service tree.

In various embodiments, the triggering event may be the establishment of the multicast parent tree. That is, the service tree may be preestablished with respect to any network issues, such as dropped flows. Rather, the service tunnel may simply be established as a matter of course in conjunction with creation of a parent tunnel in order to be rapidly available for periodic use as a service tunnel mirroring the corresponding parent tunnel. Therefore, the service tree may be implemented as part of a proactive assurance system which may not necessarily require a signal from a customer side to trigger service tunnel construction. In some instances, where the service tunnel is automatically established along with the parent tree, a service provider may utilize an internal trigger (e.g., detection of performance issues, lost flows, etc.) to duplicate a flow into the already established service tree.

In some examples, the triggering event may be a determination that a packet was not received by at least one of a tail end node (e.g., LHR) or an intermediate node (e.g., core node) of the multicast parent tree. This determination may be made automatically by monitoring the flows received by and/or sent by the network nodes. For example, an FHR, LHR, core node, etc. may detect a flow failure using counters or other traffic monitoring mechanisms. Conversely, the determination that the packet was not received may be made by receipt of a customer request submitted via, for example, a cloud-hosted API.

The triggering event may be receiving a network probing request. For example, the service tree may not always be established in response to and/or utilized to reactively correct failure cases (e.g., debugging scenarios). Rather, the service tree may be established and/or used for network management probing scenarios. For example, a request may be received to establish a service tree so that a user can use the service tree to test and/or understand the specific capabilities of the particular network parent tree without negatively impacting that parent service tree. This can provide the user with data that can be utilized to determine whether a particular flow is appropriate for and/or can successfully be communicated through the parent tree.

Further, the triggering event may be a confirmation that a particular flow is received at a head end node of the multicast parent tree. For example, when a particular flow is identified as a missing flow in the parent tree, a query may be submitted to an FHR as to whether that particular flow was received by the FHR from the data source. If that particular flow was never received by the FHR, then it may be assumed that the source of flow loss resides outside the parent tree and therefore no further remedial action is needed. Conversely, if that particular flow was received by the FHR, then it may be assumed that the source of flow loss resides inside the parent tree and therefore a service tree should be established in order to identify the particular source of that loss within the parent tree.

The establishment of the service tree may be caused by triggering a construction of a new underlay tree from the one or more intended recipient devices back to a head end node. Therefore, the parent tree path may be precisely duplicated by the service tree through hop-by-hop reconstruction informed by the parent tree's existing path. This manner of construction may reproduce the exact path taken by the parent tree even when the parent tree had an equal cost multi-path (ECM) routing decision. If the service path were not constructed hop-by-hop backwards toward the FHR using the same path as the parent tree, it may be possible that a different ECM path could be chosen in the service tree. The resulting structural variability may destroy the ability of the service tree to be used as a proxy path for the parent tree. This method of service tree construction, therefore, ensures that the service tree is an accurate copy of the parent tree with respect to data traffic handling structure and behavior and/or that no data is handled in a separate path structure and/or punt path.

At step 915, as detailed above, the process may cause a duplication of a particular flow from the multicast parent tree to the service tree. The particular flow may be selected from among a plurality of flows of the multicast parent tree. In examples, where the establishment and/or use of the service tree is part of a debugging operation with respect to the particular flow, the flow may be selected based on being identified from among the plurality of flows of the multicast parent tree as a missing flow at a network node.

The duplication of the particular flow across the parent tree and the service tree may preserve network communication of multicast flows while also providing per-flow data communication visibility across a network. For example, there may be hundreds of data receivers for the particular multicast flow. However, maybe only one of those receivers is impacted by flow loss for that particular flow. By continuing to provide the flow over the parent network, those non-impacted data receivers will continue to receive the particular flow while the issues with respect to a single negatively impacted receiver are identified and/or resolved. Of note, other LHRs and/or data receivers may be made aware of establishment of the service tree by notification over the parent tree and/or invited to join the service tree if they begin to experience loss of the particular flow.

At step 920, as detailed above, the process may cause a determination of a performance characteristic of the particular flow through the service tree. For example, telemetry data from communication of the particular flow through the service tree may be utilized to identify a performance characteristic such as a final node in the successive nodes of the service tree where the particular flow was last detected before disappearing from the service tree. Therefore, the performance characteristic of the particular flow may serve as an identification of a suspect node where the particular flow was dropped.

At step 925, as detailed above, the process may cause an association of the performance characteristic with the multicast parent tree. For instance, the performance data from the service tree and/or the suspect node where the particular flow was dropped may be inferred as applicable to the parent tree.

In addition, the process may cause an identification of a point of failure for the particular flow through the multicast parent tree based on the association of the performance characteristic with the multicast parent tree. For example, a determination may be made that the suspect node is likely the point of failure for the parent tree as well since the parent tree and the service tree are copies of one another.

Further, the process may cause the removal of the service tree from the data communication network upon completion of an examination of the performance characteristic of the particular flow through the service tree. That is, network resources may be conserved by dismantling the service tree after it has been used for a debugging operation with respect to a particular flow.

The simplified procedure 900 may then end in step 930, notably with the ability to continue establishing, reestablishing, and or using service trees to identify performance characteristics of parent trees.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for service tree for multicast flow visibility. In particular, the techniques herein introduce per-flow level insights to multicast flow network communications extensive testing or traffic disruption. The insight provided by these techniques may be utilized for failure identification, debugging, network probing, etc. In various embodiment, these techniques may be employed to identify a missing flow and rapidly and automatically pinpoint which part of the network is dropping the missing flow without disruption of delivery of the flow to non-impacted data receivers.

In still further embodiments of the techniques herein, a business impact observed metrics obtained by service trees (i.e., multicast flow visibility) can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the failure points in a service tree with failure points in a parent tree that are impacting various business transactions in order to better understand the effect on the business transactions, accordingly.

Illustratively, the techniques described herein may be performed by hardware, software, and/or firmware, such as in accordance with the illustrative service tunnel process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: causing, by a process and responsive to a triggering event, establishment of a service tree that follows a same path as a multicast parent tree through a data communication network to one or more intended recipient devices; causing, by the process, a duplication of a particular flow from the multicast parent tree to the service tree; causing, by the process, a determination of a performance characteristic of the particular flow through the service tree; and causing, by the process, an association of the performance characteristic with the multicast parent tree.

In one embodiment, the triggering event comprises an establishment of the multicast parent tree. In one embodiment, the triggering event comprises a determination that a packet was not received by at least one of a tail end node or a core node of the multicast parent tree. In one embodiment, the triggering event comprises receiving a network probing request. In one embodiment, the triggering event comprises a confirmation that the particular flow is received at a head end node of the multicast parent tree.

In one embodiment, the process further comprising: causing an identification of a point of failure for the particular flow through the multicast parent tree based on the association of the performance characteristic with the multicast parent tree. In one embodiment, the process further comprising: causing a removal of the service tree from the data communication network upon completion of an examination of the performance characteristic of the particular flow through the service tree. In one embodiment, the establishment of the service tree is caused by triggering a construction of a new underlay tree from the one or more intended recipient devices back to a head end node. In one embodiment, the particular flow is selected from among a plurality of flows of the multicast parent tree. In one embodiment, the process further comprising: causing the one or more intended recipient devices to join the service tree based on a notification that the particular flow is to be duplicated in the service tree.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: cause, responsive to a triggering event, establishment of a service tree that follows a same path as a multicast parent tree through a data communication network to one or more intended recipient devices; cause a duplication of a particular flow from the multicast parent tree to the service tree; cause a determination of a performance characteristic of the particular flow through the service tree; and cause an association of the performance characteristic with the multicast parent tree.

According to the embodiments herein, an illustrative tangible, non-transitory, computer-readable medium storing program instructions that cause a device to execute a process comprising: causing, responsive to a triggering event, establishment of a service tree that follows a same path as a multicast parent tree through a data communication network to one or more intended recipient devices; causing a duplication of a particular flow from the multicast parent tree to the service tree; causing a determination of a performance characteristic of the particular flow through the service tree; and causing an association of the performance characteristic with the multicast parent tree.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
establish, by a process and responsive to a triggering event, a service tree that follows a same path as a multicast parent tree through a data communication network to one or more intended recipient devices by triggering construction of a new underlay tree from the one or more intended recipient devices back to a first hop router;
duplicate, by the process, a particular flow from the multicast parent tree to the service tree;
determine, by the process, a performance characteristic of the particular flow through the service tree;
associate, by the process, the performance characteristic with the multicast parent tree; and
identify a point of failure for the particular flow through the multicast parent tree based on the association of the performance characteristic with the multicast parent tree.

2. The method as in claim 1, wherein the triggering event comprises an establishment of the multicast parent tree.

3. The method as in claim 1, wherein the triggering event comprises a determination that a packet was not received by at least one of a tail end node or a core node of the multicast parent tree.

4. The method as in claim 1, wherein the triggering event comprises receiving a network probing request.

5. The method as in claim 1, wherein the triggering event comprises a confirmation that the particular flow is received at a head end node of the multicast parent tree.

6. The method as in claim 1, further comprising:
causing a removal of the service tree from the data communication network upon completion of an examination of the performance characteristic of the particular flow through the service tree.

7. The method as in claim 1, wherein the establishment of the service tree is caused by triggering a construction of a new underlay tree from the one or more intended recipient devices back to a head end node.

8. The method as in claim 1, wherein the particular flow is selected from among a plurality of flows of the multicast parent tree.

9. The method as in claim 1, further comprising:
causing the one or more intended recipient devices to join the service tree based on a notification that the particular flow is to be duplicated in the service tree.

10. An apparatus, comprising:
one or more network interfaces;
a processor coupled to the one or more network interfaces and configured to execute one or more processes; and
a memory configured to store a process that is executable by the processor, the process when executed configured to:
establish, responsive to a triggering event, a service tree that follows a same path as a multicast parent tree through a data communication network to one or more intended recipient devices by triggering construction of a new underlay tree from the one or more intended recipient devices back to a first hop router;
duplicate a particular flow from the multicast parent tree to the service tree;
determine a performance characteristic of the particular flow through the service tree; and
associate the performance characteristic with the multicast parent tree; and
remove the service tree from the data communication network upon completion of an examination of the performance characteristic of the particular flow through the service tree.

11. The apparatus as in claim 10, wherein the triggering event comprises an establishment of the multicast parent tree.

12. The apparatus as in claim 10, wherein the triggering event comprises a determination that a packet was not received by at least one of a tail end node or a core node of the multicast parent tree.

13. The apparatus as in claim 10, wherein the triggering event comprises receiving a network probing request.

14. The apparatus as in claim 10, wherein the triggering event comprises a confirmation that the particular flow is received at a head end node of the multicast parent tree.

15. The apparatus as in claim 10, wherein the process when executed is further configured to:
cause an identification of a point of failure for the particular flow through the multicast parent tree based on the association of the performance characteristic with the multicast parent tree.

16. The apparatus as in claim 10, wherein the establishment of the service tree is caused by triggering a construction of a new underlay tree from the one or more intended recipient devices back to a head end node.

17. The apparatus as in claim 10, wherein the particular flow is selected from among a plurality of flows of the multicast parent tree.

18. A tangible, non-transitory, computer-readable medium storing program instructions that cause a device to execute a process comprising:
establish, by a process and responsive to a triggering event, a service tree that follows a same path as a multicast parent tree through a data communication network to one or more intended recipient devices by triggering construction of a new underlay tree from the one or more intended recipient devices back to a first hop router;
duplicate, by the process, a particular flow from the multicast parent tree to the service tree;
determine, by the process, a performance characteristic of the particular flow through the service tree;
associate, by the process, the performance characteristic with the multicast parent tree; and
identify a point of failure for the particular flow through the multicast parent tree based on the association of the performance characteristic with the multicast parent tree.

* * * * *